United States Patent [19]

Brand

[11] 4,269,953

[45] May 26, 1981

[54] METHOD OF CROSSLINKING AROMATIC THERMOPLASTIC POLYMERS USING A BIPHENYLENE TERMINATED COMPOUND

[75] Inventor: Richard A. Brand, Poway, Calif.

[73] Assignee: General Dynamics Corporation, San Diego, Calif.

[21] Appl. No.: 26,616

[22] Filed: Apr. 2, 1979

[51] Int. Cl.³ .................. C08F 283/00; C08G 75/20; C08G 75/23
[52] U.S. Cl. ................................ 525/534; 264/236; 264/347; 525/390; 525/535
[58] Field of Search ............................... 525/534, 535

[56] References Cited

U.S. PATENT DOCUMENTS

| | | | |
|---|---|---|---|
| 3,639,499 | 2/1972 | Snodgrass et al. | 525/392 |
| 4,126,661 | 11/1978 | Fulconis et al. | 264/236 |
| 4,127,615 | 11/1978 | Zahir et al. | 525/502 |
| 4,127,624 | 11/1978 | Keller et al. | 264/236 |

*Primary Examiner*—Edward M. Woodberry
*Attorney, Agent, or Firm*—John R. Duncan

[57] ABSTRACT

A method of increasing the strength and high temperature resistance of aromatic thermoplastic polymers by adding thereto an appropriate amount of certain biphenylene terminated compounds, then heating the mixture to a crosslinking reaction temperature. The biphenylene additive has been found to function as a plasticizer for the polymer, making it easier to work, mold, extrude, etc. prior to the heating step.

13 Claims, No Drawings

METHOD OF CROSSLINKING AROMATIC THERMOPLASTIC POLYMERS USING A BIPHENYLENE TERMINATED COMPOUND

BACKGROUND OF THE INVENTION

This invention relates in general to thermoplastic polymers for structural applications and, more specifically, to a method of improving the physical properties of such polymers through crosslinking.

Fiber reinforced synthetic resins have come into increasing use in structural applications. Glass fibers embedded in thermosetting resins have long been used for automobile bodies, sporting goods, etc. Recently, composites comprising graphite or boron fibers embedded in epoxy or polyester resins have been used in applications such as aircraft components, golf club shafts, etc. where a very high strength to weight ratio is desirable.

The thermosetting matrices have several problems limiting their usefulness. Once set, the matrix cannot be reshaped. The resin must ordinarily be applied as a liquid catalyst resin in a hard lay up mode, requiring complex molds and highly skilled operators. Some resins, such as the epoxys, may be applied to the fibers and cured to a tacky "B-stage". Such preimpregnated or "pre-preg" materials have limited shelf lives and are tacky and difficult to assemble on a mold for heating under pressure to produce a final structure component. Thus, thermosetting-matrix composites must ordinarily be fabricated in a controlled, factory environment.

The need for reshaping composite materials or construction of structural shapes in the field have led to the increasing use of composites in which the high strength fibers are embedded in a thermoplastic resin matrix. Such materials are in a dry, easily handled state and can be heated to the softening temperature, reshaped and cooled to produce desired product shapes. This is especially useful where beams, panels, etc. are to be formed from coils of sheet composite material by automatic machining, such as might be used in space to automatically fabricate structural components in building a space station. Unfortunately, thermoplastic materials tend to be susceptible to solvents, have a low thermomechanical limit and creep under load. Also, some thermoplastics even when heated to a softening temperature are stiff and difficult to reshape in Yoder rolls, etc.

Thus, there is a continuing need for methods of producing resin matrix materials for fiber-reinforced composites which have the strength and environmental damage resistance of thermosetting resins and the ease of forming and reshaping of thermoplastics.

SUMMARY OF THE INVENTION

The above noted problems, and others, are overcome by a method of producing an improved resin for use as a high strength fiber matrix by adding a suitable amount of certain bifunctional biphenylene terminated compounds to aromatic thermoplastic resins, shaping and/or combining the resin with high strength fibers as desired, then heating the material to a temperature at which a crosslinking reaction occurs. The biphenylene compound has been found to act as a plasticizer, permitting shaping of the material with lighter tooling and lower energy expenditure. Once crosslinked, the resin has been found to have superior properties when compared to the basic thermoplastic resin used. Among the improvements noted are an increased useful service temperature range, an increase in composite short beam shear strength, greatly reduced solubility in many organic solvents and reduced creep under load.

These materials have particular utility where a fiber reinforced resin material is to be fabricated into structural shapes, e.g. "T", "I" or angle beam configuration by rollers or other means in the field, such as by automatic beam builders constructing space stations in earth orbit or deep space.

DETAILED DESCRIPTION OF THE INVENTION

The following description and examples provide details of certain preferred embodiments of this invention and alternative variables.

Any suitable aromatic thermoplastic resin may be processed according to the method of this invention. Typical aromatic thermoplastic resins include polysulfones, polyethersulfones, polyimides, polyamides, poly (amide-imides), polyaryl ethers, polyphenylquinoxalines, polyquinolines, polyaromatic keto-ethers and polyaromatic keto-ether sulfones. Best results are obtained with polysulfones and polyether sulfones because of their excellent solvent resistance and resin compatibility.

The thermoplastic polymer and/or the biphenylene compounds are dissolved in a suitable solvent prior to mixing. Typical solvents include chloroform, dichloromethane, dimethylformamide, dimethylacetamide, N-methylpyrolidone, methylethyl ketone, dimethyl sulfoxide, and mixtures thereof. The solvent should be selected for compatibility with the polymer, and ordinarily should be low boiling to permit easy removal at temperatures well below the crosslinking temperature. For example, for polysulfone resins chloroform and dichloromethane are preferred, while for polyimides dimethylformamide and dimethylacetamide are preferred.

The solvent can be removed by any suitable means, such as slight heating in a vacuum, which does not cause crosslinking to begin. Of course, in some automatic fabrication systems, solvent removal can take place in the initial stages of heating to the crosslinking temperature. In other cases, the solvent is removed providing a solid, non-tacky preform which could typically be wound in sheet form on a reel for later reshaping at moderate temperature and finally crosslinking at the higher temperature.

Any suitable biphenylene terminated compound may be used as the plasticizer/crosslinking agent. The biphenylene and thermoplastic resin should be chosen so as to complete the crosslinking reaction at a temperature below the temperature at which degration of the resin occurs.

Best results are obtained with biphenylene terminated compounds having the formula:

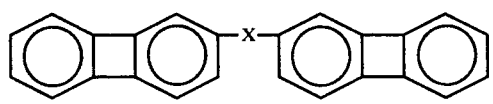

wherein X is selected from the group consisting of: isophthaloyl, carbonyl, sulfonyl, ethylene, ethylenedioxy, ethylidene, glyceryl, hydrazo, imido, malonyl, methylene, methylenedioxy, oxy, phthaloyl, propylene, succinyl, sulfinyl, terephthaloyl, tetramethylene, thio, thiocarbonyl, trimethylene, ureylene, vinylene, vinylidene, xylylene and mixtures thereof.

Any suitable amount of the biphenylene may be added to the thermoplastic resin. Good results are obtained with from about 2 to 30 wt % biphenylene terminated compound, based on resin weight. Smaller amounts do not provide complete crosslinking and much larger amounts tend to cause processing difficulties and degradative embrittlement. In general, optimum physical properties are obtained with from about 5 to 12 wt % biphenylene, based on resin weight.

After mixing the biphenylene terminated compound and resin in any suitable manner, in any suitable solvent the resin may be shaped, molded, coated onto reinforcing fibers, dried, etc. in any conventional manner, so long as the crosslinking temperature is not exceeded.

Crosslinking of the resin is initiated by heating the material to a suitable temperature, which preferably is from about 300° to 350° C. Crosslinking proceeds considerably slowly at lower temperatures, while higher temperatures tend to degrade most thermoplastic resins. At room temperature, the crosslinking reaction does not occur, providing a long shelf life for the material.

The material may be heated to the crosslinking temperature by any suitable means, such as heated rollers, radiant heating, etc.

Further details of preferred embodiments of the method of this invention will be understood upon reference to the following examples.

EXAMPLE 1 a. About 1.52 g biphenylene (prepared as described by F. M. Logullo et al., *Org. Synth.*, 48, 12, 1968), 1.52 g is mixed with 1.00 g isophthaloyl chloride in 20 ml of carbon disulfide. Aluminum chloride, 2.66 g, is added in small portions with stirring. The reaction mixture is mechanically stirred for 24 hours and is poured into 100 ml of 6 N hydrochloric acid. Steam distillation removes the carbon disulfide and any unreacted biphenylene. The yellow-brown solid is collected on a filter, washed thoroughly with water, and is dissolved in 250 ml of chloroform. The chloroform solution is stirred 30 minutes with 5% sodium hydroxide solution and separated. The base extraction is repeated two more times and is followed by two water washes. The chloroform solution is dried over anhydrous magnesium sulfate, filtered, and evaporated yielding 0.84 grams (33%) of 1,3-di(2'-biphenoyl)benzene (hereinafter referred to as "Reactive Plasticizer I"), mp 277°–279° C.

b. A first solution of 0.5 grams of 1,3-di(2'-biphenoyl)benzene (Reactive Plasticizer I) and 9.5 g of polysulfone is prepared in 100 ml of chloroform. A second identical solution, except that the reactive plasticizer I is omitted, is prepared. The solutions are each spread over a glass fabric in four steps (each side coated twice) and the solvent evaporated. The prepregs are vacuum dried at 200° F. for 24 hours. The impregnated fabrics are stacked in aluminum foil envelopes and are each heated in a press at 750° F. and 150 psi for 5 minutes. The press is cooled below 300° F. before the composites are removed. Short beam shear of the crosslinked laminate is 60% greater than the corresponding uncrosslinked polysulfone laminate. Only 20% of the crosslinked resin (first sample) is chloroform soluble as opposed to polysulfone's (second sample) complete solubility in chloroform.

EXAMPLE 2

A first solution of 0.2 g of Reactive Plasticizer I and 9.8 g of polyethersulfone is prepared in 100 ml of dichloromethane. A second similar solution, omitting the Reactive Plasticizer I, is prepared. Graphite yarn samples are run through each of the solutions onto drum winders where the solvent is allowed to evaporate. The two impregnated graphite prepreg samples are further dried in a vacuum oven at 240° F. for 8 hours. A stack of each prepreg is arranged in an aluminum foil envelope and consolidated in a press at 70° C. and 140 psi for 30 minutes. The press is cooled below 290° F. and the cured composite is removed. The composite containing Reactive Plasticizer I is found to have improved solvent resistance and short beam shear values.

EXAMPLE 3

A first solution of 0.6 g of Reactive Plasticizer I and 9.4 g of the amic acid form of the poly (amide-imide) prepared from trimellitic anhydride and 44- methylenedianiline is prepared in 100 ml of dimethylformamide. A second similar solution is prepared without Reactive Plasticizer I. Glass fabric is coated with each of the polymer solutions to yield a 30–35% resin content after solvent removal and vacuum drying. Stacks of each of the two prepregs are sealed in aluminum foil envelopes and pressed at 350 psi with slow temperature rise to 750° F. The press is cooled below 280° F. and the cured composites removed. The composite containing Reactive Plasticizer I is found to have improved high temperature resistance.

EXAMPLE 4

A solution of 0.4 g of Reactive Plasticizer I and 9.6 g of polyaryl/ether is prepared in 100 ml of methyl ethyl ketone. The solution is spread over a graphite fabric and the solvent allowed to evaporate yielding a resin content of approximately 40%. The impregnated fabric is vacuum dried an additional four hours at 200° F. The prepreg is stacked in an aluminum foil envelope and melt pressed at 690° F. and 100 psi for 15 minutes. The composite is removed from the press and cooled. It is found to have excellent strength characteristics.

EXAMPLE 5 a. About 1.52 g biphenylene is mixed with 1.00 g terephthaloyl chloride in 30 ml of carbon disulfide. Anhydrous aluminum bromide, 5.32 g, is added in small portions with stirring. The reaction mixture is stirred 24 hours and poured into 100 ml of 6 N hydrochloric acid. Steam distillation removes the carbon disulfide and any unreacted biphenylene. The yellow-brown solid is collected on a filter, washed thoroughly with water, and is dissolved in 250 ml of chloroform. The chloroform solution is stirred 40 minutes with a 5% sodium hydroxide solution and separated. The base extraction is repeated two more times and is followed by two water washes. The chloroform solution is dried over anhydrous magnesium sulfate, filtered and evaporated yielding 1,4-di(2'-biphenoyl)benzene (hereinafter referred to as Reactive Plasticizer II).

b. A solution of 0.1 g of 1,4-di(2'-biphenoyl)benzene (Reactive Plasticizer II) and 9.9 g of polysulfone is prepared in 200 ml of dichloromethane. A second solution is prepared without the Reactive Plasticizer II. The solutions are each spread over wound graphite fibers and the solvent evaporated. Each graphite prepreg is cut, stacked and debulked at 350° F. and 25 psi. Cure takes place at 720° F. and 130 psi for 20 minutes. The parts are cooled in the press below 300° F. and removed. The sample containing Reactive Plasticizer II is found to have improved creep resistance.

EXAMPLE 6 a. 2-Biphenylene carboxylic acid is prepared from the oxidation of 2-acetylbiphenylene in dioxane with sodium hypochlorite solution by the process described by W. Baker et al., J. Chem. Soc. 1476 (1954). The acid is refluxed in excess thionyl chloride to produce the acid chloride.

b. 2-Biphenylene carboxylic acid chloride (0.215 g) and 0.114 g of bisphenol-A (4,4'-isopropylidenediphenol) are melted together in a test tube under nitrogen and heated to 250° C. for one hour. The resulting crude solid bis ester (hereinafter referred to as Reactive Plasticizer III) is dissolved in chloroform and eluted over alumina. A pale yellow solid, mp 225°–8° C. (70% is obtained which exotherms at 310° C. DSC by Differential Scanning Calorimetry (peak maximum at 10° C./min heat up rate).

c. A solution of 0.35 g of Reactive Plasticizer III and 9.65 g of polysulfone is dissolved in 250 ml of dichloromethane and solution coated onto a Kevlar 49 woven fabric in stages. A second solution, omitting Reactive Plasticizer III, is similarly prepared and coated. The prepregs are oven dried at 200° F. overnight, cut, and stacked. The stacks of prepregs are consolidated in a press at 600° F. and 200 psi for 20 minutes. The press is cooled to below 300° F. and the panels removed. The panel containing Reactive Plasticizer has superior short beam shear properties.

EXAMPLE 7 a. About 0.216 g 2-Biphenylene carboxylic acid chloride (prepared as in Example 6 and m-phenylene diamine (0.108 g) are mixed with one ml of pyridine in 5 ml of n,n-dimethylacetamide. The solution is stirred for 24 hours and poured into 50 ml of dichloromethane. The dichloromethane solution is extracted three times with 6 N hydrochloric acid and three times with water. The solution is dried over anhydrous magnesium sulfate and the solvent evaporated yielding 80% of the bis(amiole), hereinafter referred to as Reactive Plasticizer IV, mp 295°–302° C. A DSC reaction exotherm is observed starting at 350° C. at a 10° C./minute heating rate.

b. A solution of 0.2 g of Reactive Plasticizer IV and 9.8 g of polyamic acid derived from pyromellitic dianlydride and 4,4'-isopropylidenedianiline in N,N-dimethylformamide is coated in stages onto carbon fabric. A second similar solution is prepared and coated, without Reactive Plasticizer IV. The DMF is evaporated and the prepregs thoroughly dried in an oven at 250° F. Stacks of each prepreg are pressed to 350 psi and heated slowly to 450° F. and held for eight hours. The heating rate continues to 700° F. and is held there for twenty minutes. The press is cooled to below 400° F. and the part removed. The part containing Reactive Plasticizer IV is found to have an improved ceiling use temperature.

EXAMPLE 8

A tape is prepared from unidirectional carbon fiber (3 mils) melt pressed between two polysulfone films (2 mil thick) a containing 3% of Reactive Plasticizer I. The tape is cut, laid up, and consolidated at 690° F. and 80 psi for thirty minutes. The press is cooled below 290° F. before laminate removal. The laminate has excellent mechanical properties and exhibits improved solvent resistance.

EXAMPLE 9

A tape is prepared from unidirectional carbon fiber (4 mils thick) melt pressed between two polyarylether films (2.3 mil thick) containing 3% of Reactive Plasticizer II. The tape is cut, laid up, and consolidated at 680° F. and 100 psi for 40 minutes. The press was cooled below 310° F. before the laminate was removed. The laminate has excellent mechanical properties.

EXAMPLE 10

A solution of 1.4 g of Reactive Plasticizer II and 18.6 g of polyethersulfone was prepared in 200 ml of chloroform. A 40 g piece of graphite fabric is impregnated with the solution in four steps (two on each side). The solvent is evaporated and the prepreg dried 24 hours at 250° F. The fabric is cut into sheets and melt pressed at 660° F. and 200 psi for 60 minutes to effect the cure. The press is cooled below 270° F. before the laminate is removed. The laminate has excellent solvent resistance and improved resistance to creep.

EXAMPLE 11

A solution of 0.9 g of Reactive Plasticizer II and 9.1 g of polyaryl ether is prepared in methyl ethyl ketone. Twenty grams of a glass fabric is impregnated with the solution in six stages (three on each side). The fabric is dried in an oven for 15 hours at 250° F. to insure solvent removal. The prepreg is cut into sheets and melt pressed at 680° F. and 220 psi for 60 minutes to effect the cure. The press is cooled below 280° F. before the laminate is removed. The laminate has excellent mechanical properties.

EXAMPLE 12

A solution consisting of 0.6 g of Reactive Plasticizer II and 9.4 g of polyarylsulfone is prepared in 100 ml of N,N-dimethylformamide. Graphite fiber is run through the solution, through a predrier and is wound on a drum. The prepreg is dried, removed from the drum and oven-dried at 300° F. for 24 hours to insure solvent removal. The prepreg is cut into sheets and melt pressed at 730° F. and 175 psi for 25 minutes to effect the cure. The press is cooled below 400° F. before the laminate is removed. The laminate has excellent solvent resistance.

EXAMPLE 13

A solution of 0.5 g of Reactive Plasticizer III and 19.5 g of polysulfone is prepared in 200 ml of dichloromethane. About 40 g of carbon fiber is run through the solution onto a drum winder where the solvent is allowed to evaporate. The prepreg is removed from the drum and oven dried at 240° F. for 18 hours to remove any residual solvent. The prepreg is cut into sheets and consolidated at 650° F. and 160 psi for 18 minutes to effect the cure. The press is cooled below 250° F. before the laminate is removed. The laminate has excellent creep resistance.

EXAMPLE 14

A solution of 0.5 g of Reactive Plasticizer III and 9.5 g of polyaryl ether is prepared in 90 ml of methyl ethyl ketone. About 20 grams of glass fiber is run through the solution onto a drum winder where the solvent is allowed to evaporate. The prepreg is removed from the drum and oven dried at 250° F. for 12 hours to remove any residual solvent. The prepreg is cut into sheets and consolidated at 650° F. and 120 psi for 35 minutes to effect the cure. The press is cooled below 260° F. before the laminate is removed. The laminate has excellent mechanical properties.

EXAMPLE 15

A solution of 0.6 g of Reactive Plasticizer III and 9.4 g of polyarylsulfone is prepared in 100 ml of N,N-dimethylformamide. About 20 g of glass fabric is impregnated with the solution in four stages (twice on a side). After each stage the solvent is evaporated. The completed prepreg is dried in an oven at 290° F. for 20 hours to remove any residual solvent. The prepreg is cut into sheets and consolidated at 680° F. and 250 psi for 15 minutes to effect cure. The press is cooled below 350° F. before laminate removal. The laminate has excellent mechanical properties.

EXAMPLE 16

A solution of 1.0 g of Reactive Plasticizer III and 9.0 g of polyethersulfone is prepared in 110 ml of chloroform. About 20 g of glass fabric is impregnated with the solution in four stages (twice on a side). After each coating the solvent is evaporated. The completed prepreg is dried in an oven at 150° F. for 12 hours to remove any residual solvent. The prepreg is cut into sheets and consolidated at 670° F. and 75 psi for 16 minutes. The press is cooled below 210° F. before laminate removal. The laminate has excellent solvent resistance, exhibiting a higher use temperature.

EXAMPLE 17

A solution of 0.4 g of Reactive Plasticizer IV and 19.6 g of polyarylsulfone is prepared in 180 ml of N,N-dimethylformamide. Approximately 37 g of carbon fiber is run through the solution and a pre-drier onto a drum winder where the solvent is allowed to evaporate. The prepreg is removed and oven dried at 250° F. for 20 hours to remove any residual solvent. The prepreg is cut into sheets and consolidated at 690° F. and 90 psi for 40 minutes to effect cure. The press is cooled below 380° F. before laminate removal. The laminate has excellent mechanical properties.

EXAMPLE 18

A solution of 0.2 g of Reactive Plasticizer IV and 9.8 g of the polyamic acid derived from pyromellitic dianhydride and m-phenylenediamine in N,N-dimethylformamide is prepared. Graphite fiber is run through the solution and a pre-drier onto a drum winder. The solvent is evaporated and the prepreg removed and dried in an oven at 250° F. for 20 hours. The prepreg is cut into plies or sheets and a stack of plies consolidated at 250 psi. The temperature is slowly increased to 690° F. over a three hour period. The press is cooled below 400° F. and the laminate removed. The laminate exhibits a high use temperature capability.

EXAMPLE 19

A solution of 0.7 g of Reactive Plasticizer I and 9.3 g of polysulfone is prepared in dichloromethane and applied to drum wound Kevlar fiber (a polyarylamide available from E. I. duPont de Nemours, Inc.) in six coatings (three on each side). The solvent is evaporated and the prepreg is oven dried at 220° F. for 20 hours to remove any residual solvent. The prepreg is cut into plies and stacked. The stack is consolidated at 680° F. and 150 psi for 45 minutes. The press is cooled below 310° F. before the laminate is removed. The laminate has excellent strength, with the resin well bonded to the fibers.

EXAMPLE 20

A solution of 0.3 g of Reactive Plasticizer IV and 9.7 g of the polyamic acid derived from 3,3',4,4'-benzophenonetetracarboxylic dianhydride and p-phenylenediamine in N,N-dimethylformamide is coated onto drum wound carbon fibers in four steps (two on each side). After each coating the solvent is evaporated. The prepreg is oven dried at 240° F. for 23 hours to remove any residual solvent. The prepreg is cut, stacked, and pressed at 340 psi. The press temperature is slowly raised to 500° F. and held for 4 hours. At this point the temperature is slowly raised to 730° F. and held for one hour. The press is cooled below 400° F. before the laminate is removed. The laminate has superior mechanical properties.

EXAMPLE 21

A solution of 1.2 g of Reactive Plasticizer I and 8.8 g of polyethersulfone is prepared in 100 ml of chloroform. Approximately 17 g of glass fabric is coated with the solution in four steps (two coatings on each side). The solvent is evaporated and the prepreg oven dried at 230° F. for 14 hours. The prepreg is cut into plies, the plies stacked and consolidated at 680° F. and 130 psi for 40 minutes. The press is cooled below 270° F. before the laminate is removed. The laminate has improved creep resistance and mechanical properties.

EXAMPLE 22

A solution of 1.5 g of Reactive Plasticizer II and 8.5 g of polyaryl/ether is prepared in 120 ml of methyl/ethyl ketone. Approximately 18 g of glass fabric is coated in six steps (three coatings per side). The solvent is evaporated after each coating. The prepreg is oven dried at 210° F. for 16 hours to remove any residual solvent. The dry prepreg is cut into plies consolidated at 685° F. and 125 psi for 60 minutes. The press is cooled below 250° F. before the laminate is removed. The laminate has increased solvent resistance and a higher use temperature.

EXAMPLE 23

A solution of 0.7 g of Reactive Plasticizer I and 8.3 g of polyaryl ether is prepared in 50 ml of methyl ethyl ketone. Approximately 25 g of glass fabric is coated in two steps (one coat per side). The solvent is evaporated after each coating. The prepreg is oven dried at 200° F. for 22 hours and the dry prepreg cut into plies. The stacked plies are consolidated at 710° F. and 150 psi for 25 minutes. The press is cooled below 260° F. before the laminate is removed. The laminate has excellent mechanical properties.

EXAMPLE 24

A solution of 3.0 g of Reactive Plasticizer II and 7.0 g of polysulfone is prepared in 50 ml of dichloromethane. Approximately 20 g of glass fabric is coated in two steps (one coat per side). The solvent is evaporated after each coating. The prepreg is oven dried at 240° F. for 15 hours and cut into plies. The stacked plies are consolidated at 715° F. and 50 psi for 15 minutes. The press is cooled below 150° F. before the laminate is removed. The laminate has a higher use temperature and excellent solvent resistance.

EXAMPLE 25

A solution of 2.0 g of Reactive Plasticizer I and 8.0 g of polyethersulfone is prepared in 90 ml of chloroform. Approximately 16 g of graphite fabric is coated in two steps (one coat per side). The solvent is evaporated after each coating. The prepreg is oven dried at 250° F. for 17 hours and cut into plies. The stacked plies are consolidated at 690° F. and 70 psi for 60 minutes. The press is cooled below 180° F. before the laminate is removed. The laminate has excellent mechanical properties.

EXAMPLE 26

A solution of 2.5 g of Reactive Plasticizer II and 7.5 g of polyethersulfone is prepared in 60 ml of chloroform. Approximately 13 g of glass fabric is coated four times (two times on each side). The solvent is evaporated after each coating. The prepreg is oven dried at 200° F. for 20 hours and cut into plies. The stacked plies are consolidated at 685° F. and 80 psi for 80 minutes. The press is cooled below 270° F. before the laminate is removed. The laminate has excellent solvent resistance.

EXAMPLE 27

A solution of 0.90 g of Reactive Plasticizer III and 9.1 g of polyarylether is prepared in 85 ml of methyl ethyl ketone. Approximately 15 g of graphite fabric is coated six times with the solution (three times on each side). After each coating the solvent is evaporated. The resulting prepreg is oven dried at 230° F. for 18 hours and cut into plies. The stacked plies are consolidated at 590° F. and 140 psi for 25 minutes. The press is cooled below 280° F. before the laminate is removed. The laminate has excellent mechanical and solvent resistance properties.

EXAMPLE 28

A solution of 0.2 g of Reactive Plasticizer III and 9.8 g of polyarylsulfone is prepared in 80 ml of N,N-dimethylformamide. Approximately 14 g of graphite fabric is coated four times (each side coated twice) with the solution. The solvent is evaporated after each coating. The resulting prepreg is oven dried at 250° F. for 24 hours and cut into plies. The stacked plies are consolidated at 630° F. and 260 psi for 15 minutes. The press is cooled below 400° F. before the laminate is removed. The laminate has improved creep resistance.

EXAMPLE 29

A solution of 0.4 g of Reactive Plasticizer IV and 9.6 g of polyarylsulfone is prepared in 80 ml of N,N-dimethylformamide. Approximately 17 g of glass fabric is coated four times (each side coated twice) with the solution. The solvent is evaporated after each coating. The resulting prepreg is oven dried at 250° F. of 24 hours and cut into plies. The stacked plies are consolidated at 700° F. and 190 psi for 30 minutes. The press is cooled below 400° F. before the laminate is removed. The laminate has excellent mechanical properties.

EXAMPLE 30

A solution of 0.5 g of Reactive Plasticizer III and 9.5 g of polyethersulfone is prepared in 50 ml of chloroform. Approximately 16 g of graphite fabric is coated four times (each side coated twice) with the solution. The solvent is evaporated after each coating. The resulting prepreg is oven dried at 200° F. for 17 hours and cut into plies. The stack of plies is consolidated at 640° F. and 100 psi for 30 minutes. The press is cooled below 290° F. before the laminate is removed. The laminate has excellent mechanical properties.

EXAMPLE 31

A solution of 0.5 g of Reactive Plasticizer I and 9.5 g of polysulfone is prepared in 50 ml of chloroform. A film is spread uniformly on a polished steel plate coated with a release agent. The resulting 3 mil film is oven dried at 200° F. for 6 hours to remove any residual solvent. Five layers of the film in aluminum foil are melt pressed at 600° F. and 100 psi for 20 minutes to a thickness of 12 mils. The cured dark yellow film exhibits a glass transition temperature (by Thermal Mechanical Analyzer) approximately 40° F. higher than untreated polysulfone and a considerably decreased flow. Solubility in chloroform is decreased to 20% instead of 100% for untreated polysulfone.

While certain specific proportions and agents were described in the above examples of preferred embodiments, these may be varied, where suitable, with similar results. For example, various additives, such as fillers, plasticizers, etc. may be used, if desired.

Other variations, applications and ramifications of this invention will occur to those skilled in the art upon reading the present disclosure. These are intended to be included within the scope of this invention as defined by the appended claims.

I claim:

1. The method of crosslinking aromatic thermoplastic polymers which comprises the steps of:
   providing an aromatic thermoplastic polymer which is substantially resistant to degradation at temperatures below about 350° C.;
   dissolving said polymer in a solvent;
   mixing therewith from about 2 to 30 wt% (based on the polymer weight) of a biphenylene terminated compound having the general formula:

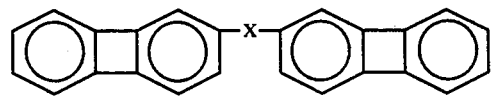

wherein X is selected from the group consisting of: isophthaloyl, carbonyl, sulfonyl, ethylene, ethylenedioxy, ethylidene, glyceryl, hydrazo, imido, malonyl, methylene, methylendioxy, oxy, phthaloyl, propylene, succinyl, sulfinyl, terephthaloyl, tetramethylene, thio, thiocarbonyl, trimethylene, ureylene, vinylene; vinylidene, xylylene and mixtures thereof;
   evaporating the solvent, and
   heating the mixture to a temperature of from about 300° to 350° C.

2. The method according to claim 1 wherein said polymer is selected from the group consisting of polysulfone, polyether sulfone and mixtures thereof.

3. The method according to claim 2 wherein said solvent selected from the group consisting of chloroform, dichloromethane and mixtures thereof.

4. The method according to claim 1 wherein from about 5 to 12 wt% of said biphenylene terminated compound is used, based on polymer weight.

5. A method of fabricating solid, high temperature resistant structures which comprises:
   providing an aromatic thermoplastic polymer which is substantially resistant to degradation at temperatures below about 350° C.;
   dissolving said polymer in a solvent;
   mixing therewith from about 2 to 30 wt% (based on the polymer weight) of a biphenylene terminated compound having the general formula:

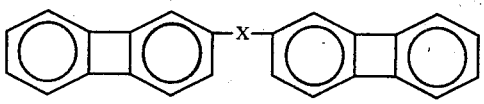

wherein X is selected from the group consisting of: isophthaloyl, carbonyl, sulfonyl, ethylene, ethylenedioxy, ethylidene, glyceryl, hydrazo, imido, malonyl, methylene, methylenedioxy, oxy, phthaloyl, propylene, succinyl, sulfinyl, terephthaloyl, tetramethylene, thio, thiocarbonyl, trimethylene, ureylene, vinylene; vinylidene, xylyene and mixtures thereof;
   shaping said mixture into the desired structural shape at a temperature below about 300° C.;
   evaporating the solvent, and
   heating the mixture to a temperature of from about 300° to 350° C.

6. The method according to claim 5 wherein said polymer is selected from the group consisting of polysulfone, polyether sulfone and mixtures thereof.

7. The method according to claim 6 wherein said solvent selected from the group consisting of chloroform, dichloromethane and mixtures thereof.

8. The method according to claim 5 wherein from about 5 to 12 wt% of said biphenylene terminated compound is used, based on polymer weight.

9. A method of manufacturing high temperature fiber reinforced structures which consists of the steps of:
   providing an aromatic thermoplastic polymer which is substantially resistant to degradation at temperatures below about 350° C.;
   dissolving said polymer in a solvent;
   mixing therewith from about 2 to 30 wt% (based on the polymer weight) of a biphenylene terminated compound having the general formula:

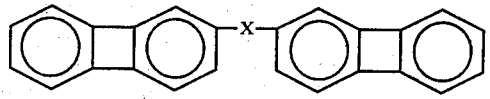

wherein X is selected from the group consisting of: isophthaloyl, carbonyl, sulfonyl, ethylene, ethylenedioxy, ethylidene, glyceryl, hydrazo, imido, malonyl, methylene, methylenedioxy, oxy, phthaloyl, propylene, succinyl, sulfinyl, terephthaloyl, tetramethylene, thio, thiocarbonyl, trimethylene, ureylene, vinylene; vinylidene, xylylene and mixtures thereof;
   impregnating reinforcing fibers with said mixture of polymer and biphenylene;
   shaping the impregnated fiber mass into a selected structural shape;
   evaporating the solvent, and
   heating the mixture to a temperature of from about 200° to 350° C.

10. The method according to claim 9 wherein said polymer is selected from the group consisting of polysulfone, polyether sulfone and mixtures thereof.

11. The method according to claim 10 wherein said solvent selected from the group consisting of chloroform, dichloromethane and mixtures thereof.

12. The method according to claim 9 wherein from about 5 to 12 wt% of said biphenylene terminated compound is used, based on polymer weight.

13. The method according to claim 9 wherein said reinforcing fibers are selected from the group consisting of fibers of boron, graphite, glass, polyarylamide and mixtures thereof.

* * * * *